June 1, 1926.
T. A. BRYSON
1,587,064
CENTRIFUGAL NUT LOCK
Filed Sept. 29, 1925
2 Sheets-Sheet 1
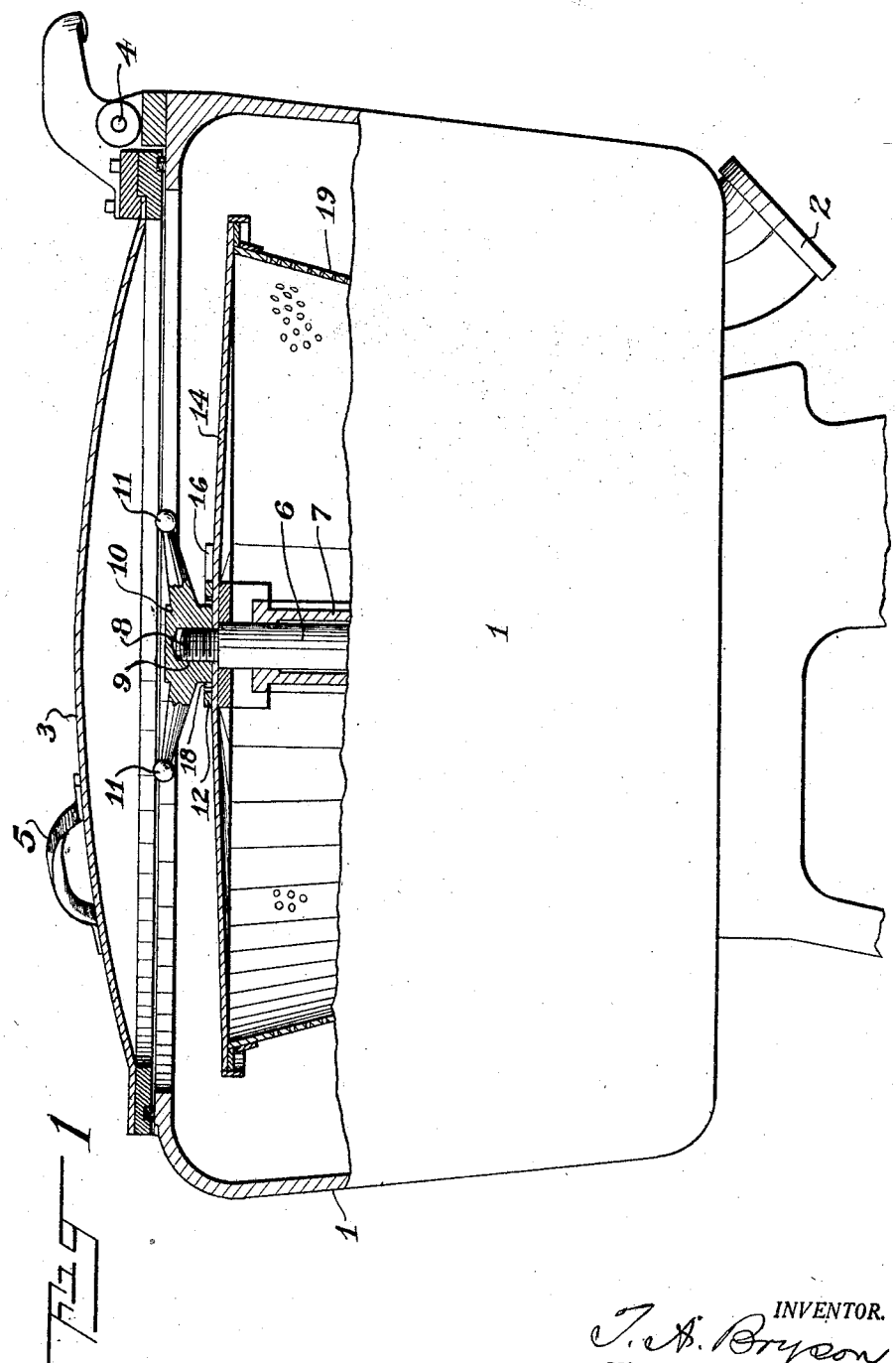
INVENTOR.
T. A. Bryson
BY
John D. Morgan
ATTORNEY June 1, 1926.
T. A. BRYSON
1,587,064
CENTRIFUGAL NUT LOCK
Filed Sept. 29, 1925
2 Sheets-Sheet 2
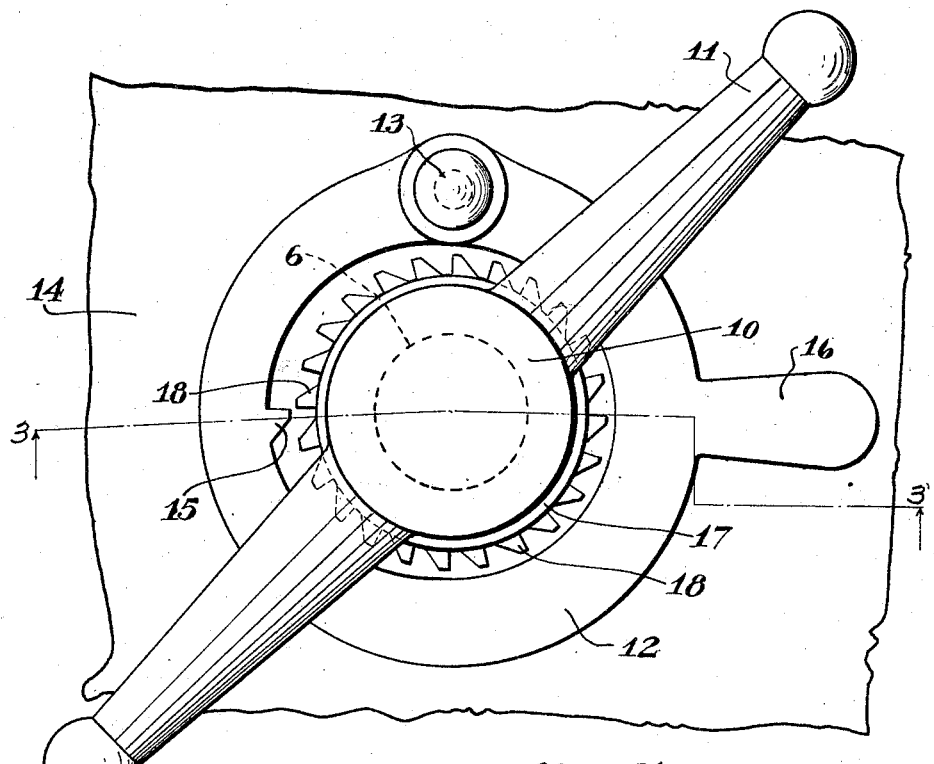
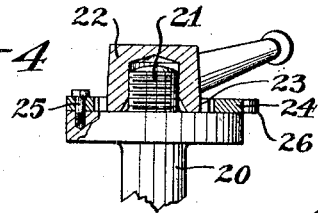
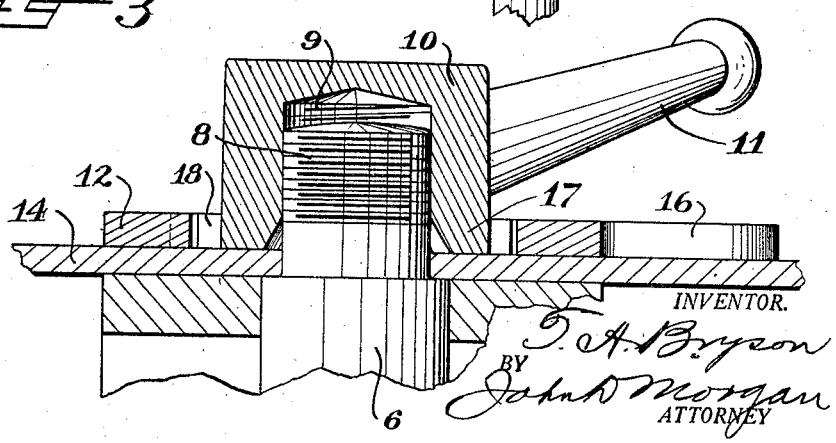
INVENTOR.
T. A. Bryson
BY John D. Morgan
ATTORNEY Patented June 1, 1926.

1,587,064

UNITED STATES PATENT OFFICE.

TANDY A. BRYSON, OF TROY, NEW YORK, ASSIGNOR TO TOLHURST MACHINE WORKS, A CORPORATION OF NEW YORK.

CENTRIFUGAL NUT LOCK.

Application filed September 29, 1925. Serial No. 59,271.

This invention relates to nut locks and more particularly to a nut lock operated by centrifugal force.

My invention is adapted for universal application. It is particularly adapted for use with centrifugal separators.

My invention further relates to certain combinations, sub-combinations, and articles of manufacture, as will be more fully hereinafter described and pointed out in the claims.

Other objects and advantages of the invention will be set forth in part hereinafter and in part will be obvious herefrom, or may be learned by practice with the invention, the same being realized and attained by means of the instrumentalities and combinations pointed out in the appended claims.

The accompanying drawings, referred to herein and constituting a part hereof, illustrate one embodiment of the invention, and together with the description, serve to explain the principles of the invention.

Of the drawings:—

Fig. 1 is a side elevation of a centrifugal separator, partly broken away to more clearly show the application of my invention to such a structure;

Fig. 2 is a plan view, on an enlarged scale, of the basket cover shown in Fig. 1 and my centrifugal nut lock;

Fig. 3 is a vertical section, on an enlarged scale, substantially on the line 3—3 of Fig. 2, looking in the direction of the arrows;

Fig. 4 is a modification, on a reduced scale, showing the simplest application of my invention.

For purposes of illustration I have shown my invention applied to a centrifugal separator. In such separators it is common to use wing nuts to cooperate with the spindles or axles of the separators, but it is found in practice that there have been many narrow escapes from injury from flying wing nuts. Also there have been narrow escapes from flying contents of the basket, as for example, showers of machine tool chips which were being separated from cutting oil.

To minimize the danger of the wing nuts flying off of the spindle during the operation of the centrifugal, and injury from such nuts, or from the contents of the basket, some users provide the wing nut and the end of the spindle with registering holes, and wire the wing nut to the spindle before each run. This, of course, takes time, is troublesome, and adds to the labor and cost of operation.

By my invention the centrifugal force of the rotating parts of the separator will automatically lock the wing nut and prevent its relative movement on the threaded end of the spindle or axle, regardless of what speeds the spindle may be rotated.

In the embodiment of my invention, shown in the drawings, 1 is the case of any suitable centrifugal separator, having the ordinary outlet 2, dome 3 hinged on the pivot 4 and provided with the handle 5. The spindle or axle 6 cooperates with the basket hub 7 and is provided with male screw-threads on its end 8 to cooperate with the female threads 9 in the wing nut 10. This wing nut is provided with the usual wings 11, 11 and, in addition thereto, is provided with a locking or engaging member to cooperate with a second locking member, the two members being thrown into locking engagement by centrifugal force.

In the particular embodiment of my invention, shown in Figs. 1, 2 and 3, I pivot a yoke 12 on the pivot 13 to the basket cover 14. This yoke is provided with a pawl or tooth 15 (Fig. 2) and also preferably with an eccentrically mounted, weighted arm 16. On the lower portion of the wing nut 10 I provide a ratchet flange 17 having the teeth 18, 18.

After the basket 19 has been filled with the articles to be treated in the separator, the basket cover 14 is placed over the screw-threaded end 8 of the spindle 6, and then the wing nut 10 is screwed up against the basket cover 14. The parts will then be in substantially the position shown in Fig. 2, in which the pawl 15 is disengaged from the teeth 18 of the ratchet flange 17. The dome 3 is then used to close the centrifugal case 1 preparatory to rotating the spindle 6. As soon as power is applied to the spindle 6 it will rotate the basket 19 and basket cover 14, counter-clockwise. Almost instantly the centrifugal force will cause the pivoted yoke 12 to rock upon the pivot 13 and move from the position shown in Fig. 2 so as to cause the pawl 15 to engage with one of the teeth 18 on the ratchet flange 17. The eccentrically weighted arm 16 actuated by the centrifugal force assists this rocking of the pivoted yoke 12. As soon as this pawl engages with one of these teeth 18, the wing nut is locked and cannot screw off of the screw-threaded portion 8 of the spindle 6.

In stopping the rotation of the basket 19 and spindle 6 by the ordinary brake, not shown, there will be a tendency, due to the continued rotation of the wing nut 10 for it to become disengaged from the pawl or tooth 15. It is possible, due to the spring of the basket cover 14 and back lash that a tooth 18 of the ratchet 17 on the cap might slip under the pawl 15, but there will be no injury or disastrous effect on the mechanism because the stressing of the parts in this direction simply screws up the wing nut tighter upon the spindle 6. A small amount of back-lash between the pawl 15 and the nut 10 makes no difference since the cover 14 is springy and the nut does not have to be screwed up to a definite stop. In starting the centrifugal, the nut may tend to back off until the pawl and ratchet are engaged; however, this will be almost instantly. The eccentric weighted arm 16 also acts as a handle or lever to disengage the pawl 15 from the particular tooth 18 with which it is in engagement on the ratchet 17.

I have shown the simplest form of my nut lock in Fig. 4, in which the driving member or spindle 20 has the same reduced screw-threaded end 21, on which the driven member 22, in the form of wing nut, is screw-threaded. This driven member or wing nut is provided with a similar ratchet flange 23 to cooperate with the pivoted locking member or yoke 24 secured on the driving member, or spindle 20, by the pivot pin 25. This yoke 24 is also provided with an eccentric weighted arm 26 and is in all respects the same as the one shown in Fig. 2, and the other figures of the drawings. In this modification the pivoted yoke is mounted directly upon the driving member or spindle 20, rather than upon an intermediate member, as the basket cover 14 in the other figures. The operation, however, is identically the same.

The invention in its broader aspects is not limited to the specific mechanisms shown and described, but departures may be made therefrom within the scope of the accompanying claims without departing from the principles of the inventon and without sacrificing its chief advantages.

What I claim is:—

1. In a centrifugal nut lock the combination of a driving member, a driven member and locking means operated by centrifugal force to lock the members together.

2. In a centrifugal nut lock the combination of a driving member provided with engaging surfaces, a driven member provided with cooperating engaging surfaces, and locking means operated by centrifugal force to lock the members together when rotated in one direction, the cooperating engaging surfaces locking the members together when the members tend to rotate in the opposite direction.

3. In a centrifugal nut lock the combination of a driving member provided with screw-threads, a driven member provided with cooperating screw-threads, and locking means operated by centrifugal force to lock the members together when rotated in one direction, the screw-threads preventing relative rotation of the members in the opposite direction.

4. In a centrifugal nut lock the combination of a driving member, a driven member, and a pivoted locking member adapted to be rocked on its pivot by centrifugal force and lock the driving and driven members together.

5. In a centrifugal nut lock the combination of a driving member, a driven member, a clamped member, and locking means supported by the clamped member and operated by centrifugal force to lock the driving, driven and clamped members together.

6. In a centrifugal nut lock the combination of a driving member provided with engaging surfaces, a driven member provided with cooperating engaging surfaces and with a locking member, and a cooperating locking member adapted to be operated by centrifugal force to engage said first locking member.

7. In a centrifugal nut lock the combination of a driving member provided with engaging surfaces, a driven member provided with cooperating engaging surfaces and with a ratchet and a cooperating pawl adapted to be operated by centrifugal force to engage said first ratchet.

8. In a centrifugal nut lock the combination of a driving member provided with engaging surfaces, a driven member provided with cooperating engaging surfaces and with a locking member, and a cooperating locking member provided with an eccentrically mounted weight, said cooperating locking member being adapted to be operated by centrifugal force to engage said first locking member.

9. In a centrifugal nut lock the combination of a driving axle or spindle provided with screw-threads, a nut mounted on said screw-threads and provided with a locking flange, a pivoted centrifugally actuated yoke provided with a locking member adapted to engage the locking flange of the nut to prevent relative rotation of the nut and spindle on one direction of rotation, relative rotation of the spindle and nut in the opposite direction being prevented by the cooperating screw-threads.

10. The combination of a drive member, a nut, and an automatic nut lock actuated by the rotation of the drive member to secure the nut to the drive member.

In testimony whereof, I have signed my name to this specification.

TANDY A. BRYSON.